US012180681B2

(12) United States Patent
Okazaki

(10) Patent No.: US 12,180,681 B2
(45) Date of Patent: Dec. 31, 2024

(54) CONSTRUCTION MACHINE

(71) Applicant: Yanmar Holdings Co., Ltd., Osaka (JP)

(72) Inventor: Kohei Okazaki, Chikugo (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 0 days.

(21) Appl. No.: 18/221,842

(22) Filed: Jul. 13, 2023

(65) Prior Publication Data

US 2024/0018747 A1 Jan. 18, 2024

(30) Foreign Application Priority Data

Jul. 14, 2022 (JP) ................................ 2022-113358

(51) Int. Cl.

| | |
|---|---|
| ***E02F 9/08*** | (2006.01) |
| ***E02F 9/16*** | (2006.01) |
| ***E02F 9/22*** | (2006.01) |
| ***F15B 1/26*** | (2006.01) |
| ***F15B 21/0423*** | (2019.01) |

(52) U.S. Cl.

CPC .......... *E02F 9/2203* (2013.01); *E02F 9/0866* (2013.01); *E02F 9/0875* (2013.01); *E02F 9/0883* (2013.01); *E02F 9/16* (2013.01); *E02F 9/226* (2013.01); *F15B 1/26* (2013.01); *F15B 21/0423* (2019.01); *E02F 9/2285* (2013.01); *E02F 9/2292* (2013.01)

(58) Field of Classification Search

CPC ..... E02F 9/0866; E02F 9/0875; E02F 9/0883; E02F 9/16

See application file for complete search history.

(56) References Cited

U.S. PATENT DOCUMENTS

| | | | | |
|---|---|---|---|---|
| 2014/0034403 | A1* | 2/2014 | Tokuda | E02F 9/0866 180/89.12 |
| 2020/0190774 | A1* | 6/2020 | Nishigori | E02F 9/16 |
| 2021/0114451 | A1* | 4/2021 | Yamamoto | E02F 9/0891 |
| 2024/0018748 | A1* | 1/2024 | Okazaki | E02F 9/0875 |

FOREIGN PATENT DOCUMENTS

| | | |
|---|---|---|
| JP | 2009-068172 A | 4/2009 |

* cited by examiner

*Primary Examiner* — Kenneth Bomberg
*Assistant Examiner* — Matthew Wiblin
(74) *Attorney, Agent, or Firm* — NORTON ROSE FULBRIGHT US LLP

(57) ABSTRACT

On a turn frame of an excavation machine, a hydraulic oil tank is placed in the center of a right engine chamber in the front-back direction, a control valve is placed in front of the hydraulic oil tank, a battery is further placed in front of the control valve, and a cool mechanism is placed behind the hydraulic oil tank. The control valve is supported by a support member, and a controller that outputs a signal for driving the control valve is mounted to a side plate part of the support member, thereby to be placed in a position in front of the control valve and above the battery.

18 Claims, 5 Drawing Sheets

CONSTRUCTION MACHINE

CROSS-REFERENCE TO RELATED APPLICATIONS

This application claims priority under 35 U.S.C. § 119 to JP Application No. 2022-113358 filed Jul. 14, 2022 the entire contents of which are hereby incorporated by reference.

TECHNICAL FIELD

The present invention relates to a construction machine that electrically controls a control valve that controls, for example, the direction and flowrate of a hydraulic oil supplied to a hydraulic actuator.

BACKGROUND ART

Conventionally, a construction machine such as an excavation machine, for example, is provided with devices such as an engine, a work device, a run device, etc., and, so as to electrically control the action of these devices, is further provided with a controller that corresponds to each of these devices. To a power unit such as a control valve, the controller sends an output signal which corresponds to an input signal from an operation part, thereby to causes each device to act. The above controller is provided with an electronic instrument such as a processor that performs an arithmetic process. Due to this, the controller is placed in a place which is not affected by heat and which is protected from a vibration and a shock (see, for example, Patent Document 1).

Patent Document 1 discloses a configuration in which the controller is placed on a rear face of a transverse plate that reinforces a support bracket that supports, in a turn frame, a base end part of a front work machine.

PRIOR ART DOCUMENT

Patent Document

Patent document 1: Japanese Unexamined Patent Application Publication No. 2009-068172

SUMMARY OF INVENTION

Technical Problem

An electric part, such as the controller, installed on the construction machine is interconnected with a mechanical part, which serves as a power unit, by means of a wire harness as a supply line for electric power and a communication line for a signal. Further, in the construction machine provided with plural hydraulic instruments activated by a hydraulic pressure, a solenoid control valve is employed for the control valve that adjusts the flow direction and flowrate of the hydraulic oil, and the action of the control valves is electrically controlled by the controller. In the above electrically controlled construction machine where the action of the hydraulic instrument is controlled by electricity, the wire harness, as the case may be, is difficult to wire in relation to the layout of each machine part in the turn frame. For example, the area around the position where the controller is placed in the placement configuration disclosed in Patent Document 1 is a space in capable of placing the control valve. This causes the control valve to be placed in a position far from the controller, causing a problem of increasing the difficulty of wiring the wire harness.

Further, the controller that outputs the electric signal to the control valve needs to receive a pressure signal of a hydraulic pump that discharges a hydraulic oil toward the control valve. Thus, the controller sends and receives signal to and from plural instruments; thus, in view of the positional relation of each instrument, plural wire harnesses must be wired from one controller. Thus, it is desirable for the controller to be placed in a position where it is easy to wire the wire harnesses from plural instruments.

The present invention has been made in view of the above problem; it is an object of the present invention to simplify, in an electrically controlled construction machine, a wiring of a wire harness between a controller and a control valve.

Solution to Problem

A construction machine according to the present invention, in a housing chamber on a side of a machine body, includes: a hydraulic oil tank that tanks a hydraulic oil discharged by a hydraulic pump driven by a prime mover; a control valve that controls a flow direction and flowrate of the hydraulic oil to a plurality of hydraulic actuators actuated by the hydraulic oil discharged from the hydraulic pump; and a controller that outputs a signal that controls the control valve, wherein the control valve is placed in front of the hydraulic oil tank, and the controller is placed in front of the control valve.

The construction machine according to another mode of the present invention, wherein a battery that supplies power to the controller is placed in front of the control valve, and the controller is placed above the battery.

The construction machine according to another mode of the present invention, wherein a driver seat is placed on another side of the machine body, and the controller is placed in a position shifted to the driver seat side relative to a center of the battery.

The construction machine according to another mode of the present invention, wherein the controller is supported on an inner wall part on the driver seat side within the housing chamber.

The construction machine according to another mode of the present invention, wherein the control valve, in plan view, is so placed as to be shifted toward the inner wall part from the hydraulic oil tank's side face on the driver seat side.

The construction machine according to another mode of the present invention, wherein the controller, in front view, is placed not overlapping the hydraulic oil tank.

The construction machine according to another mode of the present invention, wherein a cool mechanism that cools the hydraulic oil is placed behind the hydraulic oil tank.

Advantageous Effects of Invention

The present invention makes it possible to simplify, in an electrically controlled construction machine, a wiring of a wire harness between a controller and a control valve.

DESCRIPTION OF EMBODIMENTS

In a construction machine that, by means of an electric signal, controls an action of a control valve that adjusts the flow direction and flowrate of a hydraulic oil pumped toward each of plural hydraulic actuators, for example, the present invention devises a placement of a controller thereby to facilitate a wiring of a wire harness between the controller and an instrument connected to the controller. Descriptions will hereinafter be made on embodiments of the present invention with reference to drawings.

In the embodiment of the present invention, the description will be made on an excavation machine (shovel), which is a turn work vehicle, as an example of a construction machine according to the present invention. However, the construction machine according to the present invention is not limited to the excavation machine, and is widely applicable to other types of construction machines such as a bulldozer, a crane work machine, a compact truck loader, a skid steer loader, and a wheel loader.

[Overall Configuration of Excavation Machine]

Figure 1:
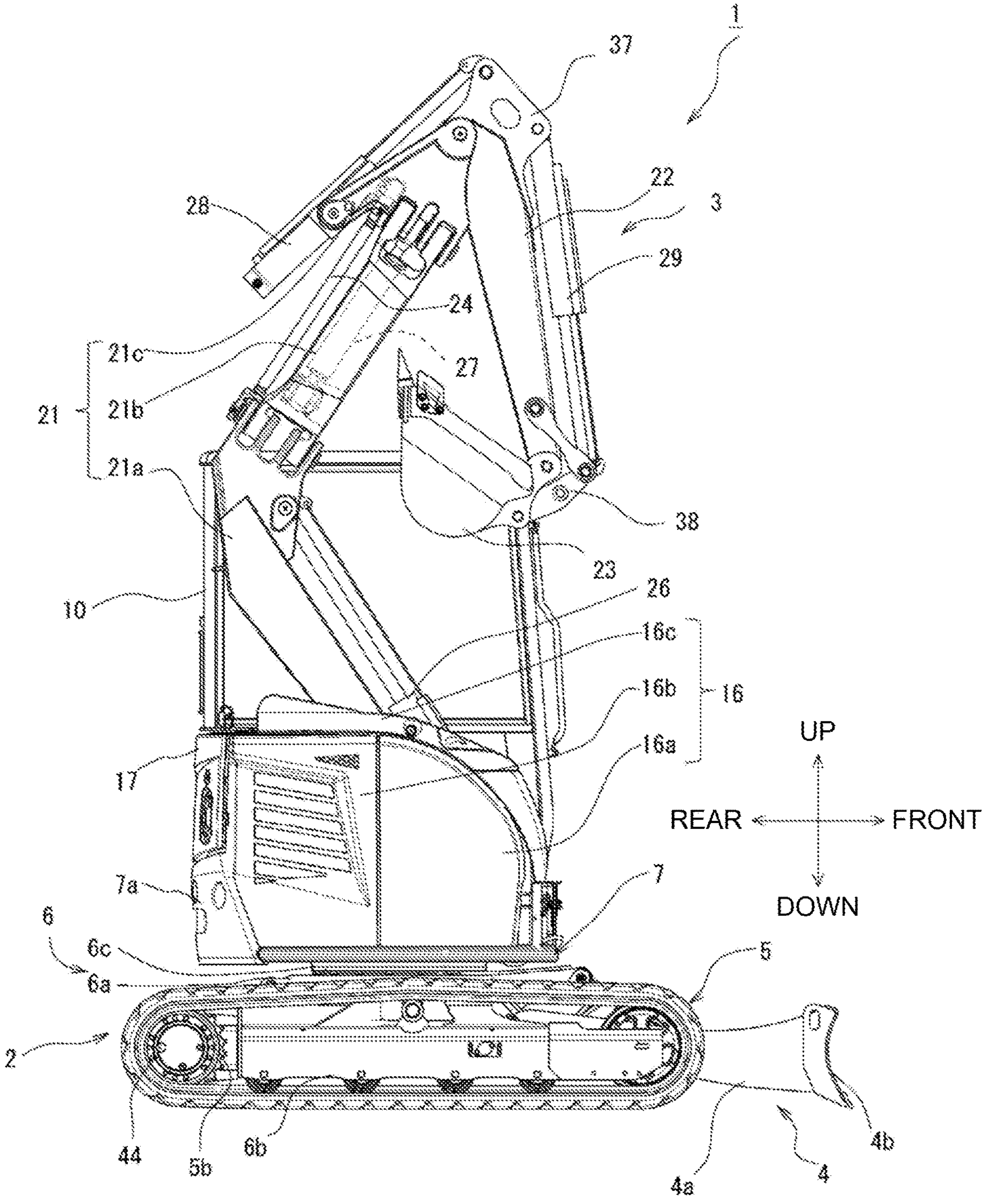
FIG. 1 is a right side view of an excavation machine according to an embodiment of the present invention.

A description will be made, with reference to FIG. 1, on an overall configuration of an excavation machine 1 according to the present embodiment. Unless a directional view is specified, the terms “front side”, “rear side”, “right and left side”, “plan side” or “up side”, “bottom side” or “down side” are used below with reference to a position of an operator seated on a driver seat of the excavation machine 1. As shown in FIG. 1, the excavation machine 1 is a so-called super-mini excavation machine, and includes a self-propelled run vehicle body 2, and an excavation device 3 and a soil removal device 4 each of which is a work part mounted to the run vehicle body 2.

The excavation machine 1 has a pair of right and left crawler type run parts 5, a truck frame 6 as a base supporting the right and left run parts 5, and a turn frame 7 provided on the truck frame 6.

The run part 5 has a configuration in which a crawler is wound around plural rotary bodies such as sprockets supported to a given frame part included in the truck frame 6. A rear end part of the run part 5 has a drive sprocket **5*a* as a rotary body. The truck frame 6 has a center frame unit 6*a* positioned between the right and left run parts 5, 5, and a side frame unit 6*b* provided on each of both right and left sides of the center frame unit 6*a***.

The right and left run parts 5, 5 are driven by a pair of right and left run hydraulic motors 44, 44. The run hydraulic motor 44 is a hydraulic actuator that is driven by a supply of a hydraulic oil. In each of the run parts 5, the run hydraulic motor 44 is so provided as to be mounted to a given site such as the side frame unit **6*b* of the truck frame 6, and drives the drive sprocket for rotation. Each of the right and left run hydraulic motors 44, 44 drives one of the respective run parts 5, thereby to cause the excavation machine 1** to run straightly back and forth or to turn to the right and left.

A soil removal device 4 is mounted to a front side of the truck frame 6. The soil removal device 4 has a pair of support frames **4*a* extending in the front-back direction between the right and left run parts 5, 5, and a blade 4*b* as a soil removal plate provided on the tip side of the support frame 4*a*. The soil removal device 4 is so provided as to be upped and downed in a rotary manner by a blade cylinder (not shown) provided between the support frame 4*a* and the truck frame 6**.

The turn frame 7 is configured in a substantially circular shape in plan view, and is so provided as to turn, relative to the truck frame 6, in any of right and left directions around an up-down axis. On the upper side of the truck frame 6, there is provided a turn device including a turn bearing **6*c* and a turn hydraulic motor (not shown). The turn hydraulic motor is a hydraulic actuator driven by a supply of the hydraulic oil, and turns the turn frame 7 via the turn bearing 6*c***.

Figure 3:
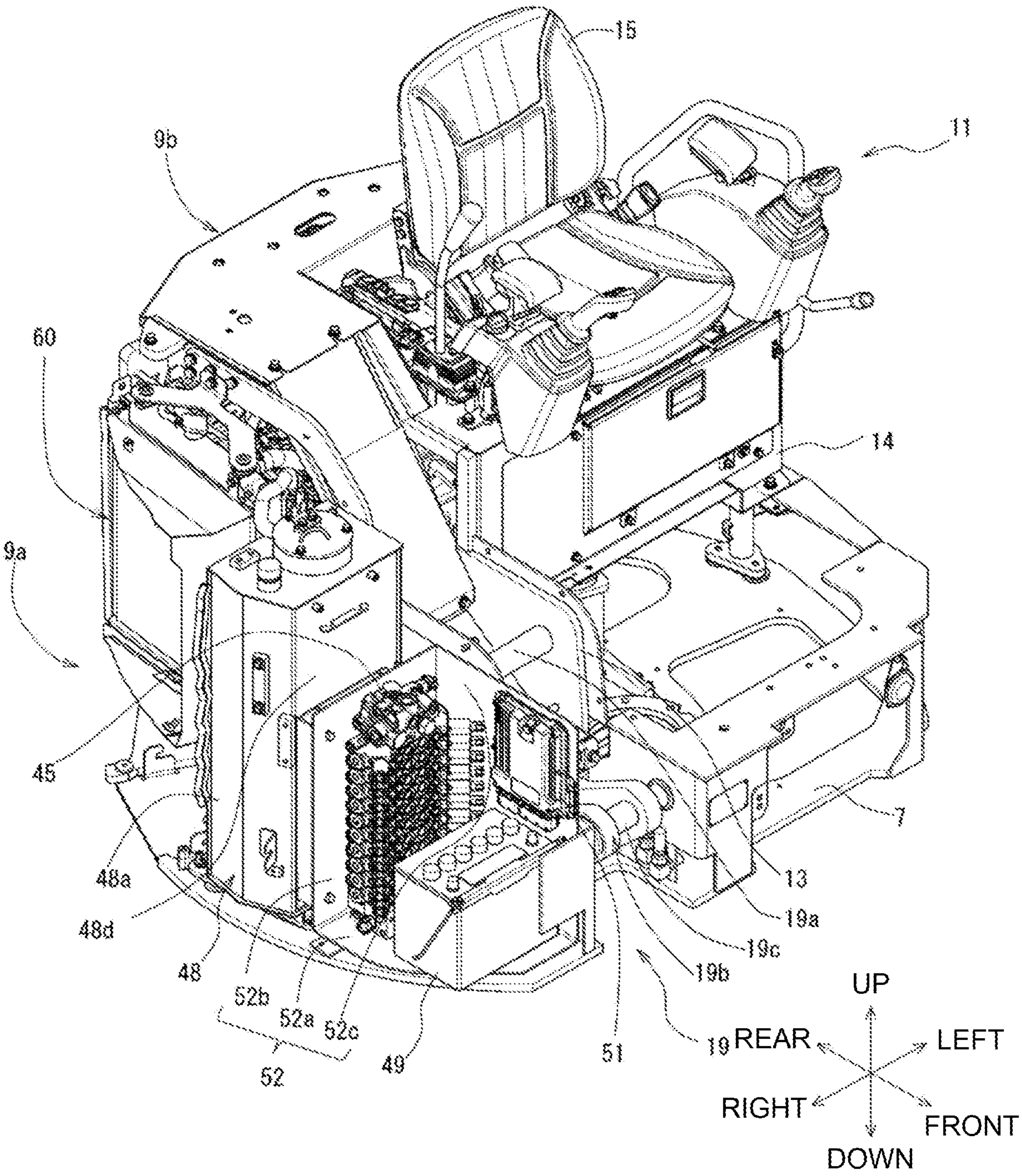
FIG. 3 is a perspective view from the right front, showing a layout of each configuration on a turn frame according to the embodiment of the present invention.

On the turn frame 7, there is provided a drive part 11 (see FIG. 3). The drive part 11 is for driving and operating the run vehicle body 2, the excavation device 3, and the soil removal device 4, and is provided in a cabin 10 provided on the turn frame 7. The cabin 10 has a frame that forms an outline thereof and a plurality of window parts made of a transparent member such as glass, and is configured as a whole in a substantially box shape. A door is provided on the left side of the cabin 10, serving as an entrance/exit for an operator to and from the drive part 11.

In the drive part 11; a driver seat support base 14 as a seat mount is provided on a rear side of a floor part, and a driver seat 15 is provided on the driver seat support base 14 (see FIG. 3). The drive part 11 is provided with, for example, a pair of run levers extending upward from the floor part and a work operation pedal provided on the floor part. Further, in the drive part 11, the driver seat 15 is surrounded by a work operation lever for operating the work part (excavation device 3 or soil removal device 4) and an operation panel part having various operation parts such as a switch. The work operation lever, which is included in the work part, is also referred to as an electric joystick, and outputs an electric signal that is in response to the operation amount of the operator.

Further, on the turn frame 7, there is provided an engine chamber 9 that covers an engine and the like covered with a hood. The engine chamber 9 includes a right engine chamber **9*a* positioned on the right side of the turn frame 7 and a rear engine chamber 9*b* positioned in a rear part of the turn frame 7**.

A counterweight **7*a* is provided in a rear down part of the turn frame 7. Further, the turn frame 7 includes a right hood 16 and a rear hood 17** as exterior covers.

The right hood 16 has a right front side face cover part **16*a*, a right rear side face cover part 16*b*, and an upper face cover part 16*c*, covering the right engine chamber 9*a* on the right side of the turn frame 7. The right rear side face cover part 16*b* is formed with a vent for ventilation in and out of the engine chamber 9. The right front side face cover part 16*a*, the right rear side face cover part 16*b*, and the upper face cover part 16*c* are connected via a connection member. The left side of the upper face cover part 16*c* is rotatably supported by a hinge part, so that the right front side face cover part 16*a*, the right rear side face cover part 16*b*, and the upper face cover part 16*c* can be integrally opened and closed in the up-down direction. Further, the right hood 16 may be so configured that the right front side face cover part 16*a*, the right rear side face cover part 16*b*, and the upper face cover part 16*c* can be individually opened or removed. Further, on the left side of the right engine chamber 9*a*, there is provided a bulkhead 18**, and an area between the bulkhead 18 and the cabin 10 is a transfer area for a boom 21, described below, of the excavation device 3.

The rear hood 17 is provided above the counterweight 7*a*, and together with the counterweight 7*a*, covers the rear engine chamber 9*b* in the rear part of the turn frame 7. The rear hood 17, with its one end on each of right and left rotatably supported by a hinge part, is so provided as to be opened and closed.

The excavation device 3 is a front work machine that is provided on a front side of the excavation machine 1. On the front side of the turn frame 7, and between the right engine chamber 9*a* and the cabin 10, there is provided a boom support part 19 by which a base part of the excavation device 3 is rotatably supported (see FIG. 3).

The boom support part 19 includes a pivot shaft 19*a*, which is bridged between the bulkhead 18 on the right engine chamber 9*a* side and a wall part 13 on the cabin 10 side and by which the base part of the boom 21 to be described below is pivotally supported, and a cylinder bracket 19*b* by which a cylinder side end part of a boom cylinder 26 to be described below is rotatably supported. The cylinder bracket 19*b* has such a configuration that a support shaft 19*c* parallel to the pivot shaft 19*a* is bridged to a pair of support plates so provided on the turn frame 7 as to protrude upward. Further, the bulkhead 18 on the right engine chamber 9*a* side and the wall part 13 on the cabin 10 side are reinforcing members that are extended in the front-back direction with the left-right direction as a plate thickness direction and that are of the turn frame 7.

The excavation device 3 has the boom 21 that is included in a base part side of the excavation device 3, an arm 22 that is connected to a tip side of the boom 21, and a bucket 23 that is mounted to a tip part of the arm 22. Further, the boom 21 includes a first boom 21*a*, a second boom 21*b*, and a third boom 21*c*.

The first boom 21*a* has a configuration in which a tip side is bent forward at an obtuse angle in side view, and a base end is supported by the boom support part 19 provided on the turn frame 7. The base end of the first boom 21*a* is pivotally supported on the pivot shaft 19*a* which has a left-right axial direction, thereby to so support the boom 21 on the turn frame 7 as to swing in an up-down direction.

A base end of the second boom 21*b* is so supported to the tip of the first boom 21*a* as to swing in the left-right direction.

The third boom 21*c* has a substantially triangular shape in side view, and is so supported to the tip of the second boom 21*b* as to swing in the left-right direction. The first boom 21*a* and the third boom 21*c* are connected to each other by an offset link 24 provided parallel to the second boom 21*b*. The first boom 21*a*, the second boom 21*b*, the third boom 21*c* and the offset link 24 are so connected as to form a parallelogram link mechanism.

The excavation device 3 has a boom cylinder 26 to rotate the first boom 21*a*, an offset cylinder 27 to rotate the second boom 21*b* and the offset link 24, an arm cylinder 28 to rotate the arm 22, and a work tool cylinder 29 to rotate the bucket 23. The above cylinders are each a hydraulic cylinder. In the excavation device 3, another device such as a grapple or a breaker is mounted instead of the bucket 23 in accordance with work contents.

On the front side of the first boom 21*a*, the boom cylinder 26 is provided along the length direction of the first boom 21*a*. The base end (cylinder side end part) of the boom cylinder 26 is rotatably supported on the support shaft 19*c* of the cylinder bracket 19*b* (see FIG. 3). As the boom cylinder 26 extends and retracts, the first boom 21*a* swings around the pivot shaft 19*a*.

On the left side face of the second boom 21*b*, the offset cylinder 27 is placed in the length direction. The rod side end part of the offset cylinder 27 is rotatably connected to the left side face part of the third boom 21*c* via a bracket. The cylinder side end part of the offset cylinder 27 is rotatably connected to a bracket protruding from the left side face part on the base end side of the second boom 21*b*. The offset cylinder 27 extends and retracts, thereby to swing the second boom 21*b* and the offset link 24 to the right and left.

The arm cylinder 28 has its cylinder side rotatably supported by the third boom 21*c* and its rod side end part rotatably supported by a bracket part 37 provided on the base end side of the arm 22. The arm 22, by the extending and retracting of the arm cylinder 28, swings around a connection shaft between the arm 22 and the third boom 21*c* with the left-right direction as an axial direction.

The work tool cylinder 29 is provided along the length direction of the arm 22, has the cylinder side rotatably supported by the bracket part 37 provided on the base end side of the arm 22, and has the rod side end part rotatably supported by a bracket part 38 on the bucket 23 side. The bucket 23, by the extending and retracting of the work tool cylinder 29, swings around a connection shaft between the bucket 23 and the arm 22 with the left-right direction as an axial direction.

In the excavation machine 1 provided with the above configuration, the operator who is seated on the driver seat 15 properly operates the run lever, the work operation lever and the like, thereby to perform a desired action or work. Specifically, operating the run lever, for example, causes the excavation machine 1 to make a front-back linear run or a right/left turn run. Further, operating the work operation lever causes the excavation device 3 to perform the excavating work, or causes the soil removal device 4 to perform the soil removal work or leveling work.

[Hydraulic System]

Figure 2:
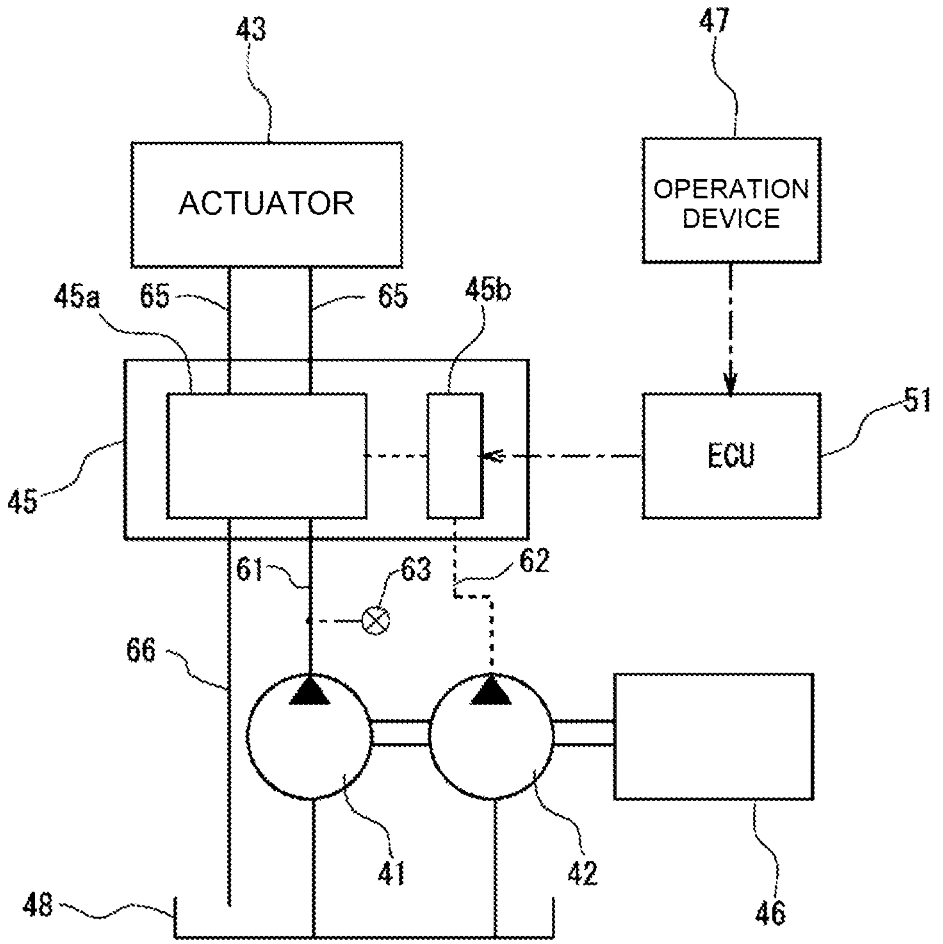
FIG. 2 is a block diagram describing a hydraulic system of the excavation machine according to the embodiment of the present invention.

The excavation machine 1 according to the present embodiment is a construction machine that, by electric control, controls the action of a plurality of hydraulic actuators. FIG. 2 shows a block diagram of part of an electric control hydraulic system of the excavation machine 1. In FIG. 2, an actuator 43 refers to any one of various hydraulic actuators, such as a blade cylinder, the boom cylinder 26, the offset cylinder 27, the arm cylinder 28, the work tool cylinder 29, the run hydraulic motor 44, and the turn hydraulic motor.

The engine 46 is configured as a diesel engine, for example, and is placed in the rear engine chamber 9*b* that is in a transverse direction with the drive shaft's axial direction in substantially left-right direction and that is positioned in the rear part of the turn frame 7. The engine 46 is a drive source for a hydraulic pump 41 (main pump) and a pilot pump 42, and the hydraulic pump 41 and the pilot pump 42 are mechanically connected to the engine 46.

The hydraulic pump 41 is for supplying the hydraulic oil in the hydraulic oil tank 48 to the actuator 43 via a direction switch valve 45*a* of a control valve 45 to be described below. The hydraulic pump 41 and the direction switch valve 45*a* are connected by a supply piping 61. The supply piping 61 is provided with a pressure sensor 63 for detecting a discharge pressure of the hydraulic oil discharged from the hydraulic pump 41. A detection signal of the pressure sensor 63 is input via a communication line to a controller 51.

The pilot pump 42 is for supplying a pilot pressure to the direction switch valve 45*a* via a solenoid proportional valve 45*b* of the control valve 45. The pilot pump 42 and the solenoid proportional valve 45*b* are connected by a pilot pressure supply piping 62.

The control valve 45 is so configured as to control the flow direction and flowrate of the hydraulic oil in the hydraulic system. In the present embodiment; to one or more of the blade cylinder, the boom cylinder 26, the offset cylinder 27, the arm cylinder 28, the work tool cylinder 29, the right and left run hydraulic motors 44, and the turn hydraulic motor, the control valve 45 selectively supplies the hydraulic oil discharged from the hydraulic pump 41. Thus, in the actual hydraulic system, the control valve is configured as a valve unit including a direction switch valve 45*a* and a solenoid proportional valve 45*b* for each of the plural actuators 43.

The direction switch valve 45*a* is a pilot-operated direction control valve, and includes, for example, a 4-port, 3-position hydraulic pilot operated direction control valve. The direction switch valve 45*a* is provided with a plurality of ports to which hydraulic pipes including tubes, etc., are connected. Connected to each port include a supply piping 61 as a discharge line of the hydraulic pump 41, a supply-discharge piping 65 as a hydraulic pressure supply line to the actuator 43 and a hydraulic pressure discharge line from the actuator 43, and a return piping 66 as a return line to the hydraulic oil tank 48.

A current corresponding to the operation amount of an operation device 47 is output from the controller 51 to the solenoid proportional valve 45*b*; then, to an input port of the direction switch valve 45*a*, the solenoid proportional valve 45*b* outputs a pilot pressure proportional to the input current, thereby to slide a souple of the direction switch valve.

The operation device 47 refers to various operation devices, such as a run lever, a work operation pedal, and a work operation lever, which are provided on the drive part 11, and which correspond to the respective actuators 43.

The action of the control valve 45 is controlled by the controller 51. The controller 51, also referred to as an ECU (Electronic Control Unit), includes a computer unit, which includes an arithmetic unit and a storage, and a communication module. From the No. 1 operation device 47 that corresponds to the No. 1 actuator 43, the controller 51 receives an electric signal that is in response to the operator's operation, and outputs, to the solenoid proportional valve 45*b*, an instruction signal which is based on the electric signal. This adjusts the pilot pressure given from the solenoid proportional valve 45*b* to the direction switch valve 45*a*, thereby to control the direction flow and flowrate of the hydraulic oil by the direction switch valve 45*a*.

In the hydraulic system provided with the above configuration, controlling the hydraulic oil supplied via the control valve 45 to the actuator 43 activates the excavation device 3 and turns the turn frame 7.

[Layout of Each Configuration on Turn Frame]

Figure 4:
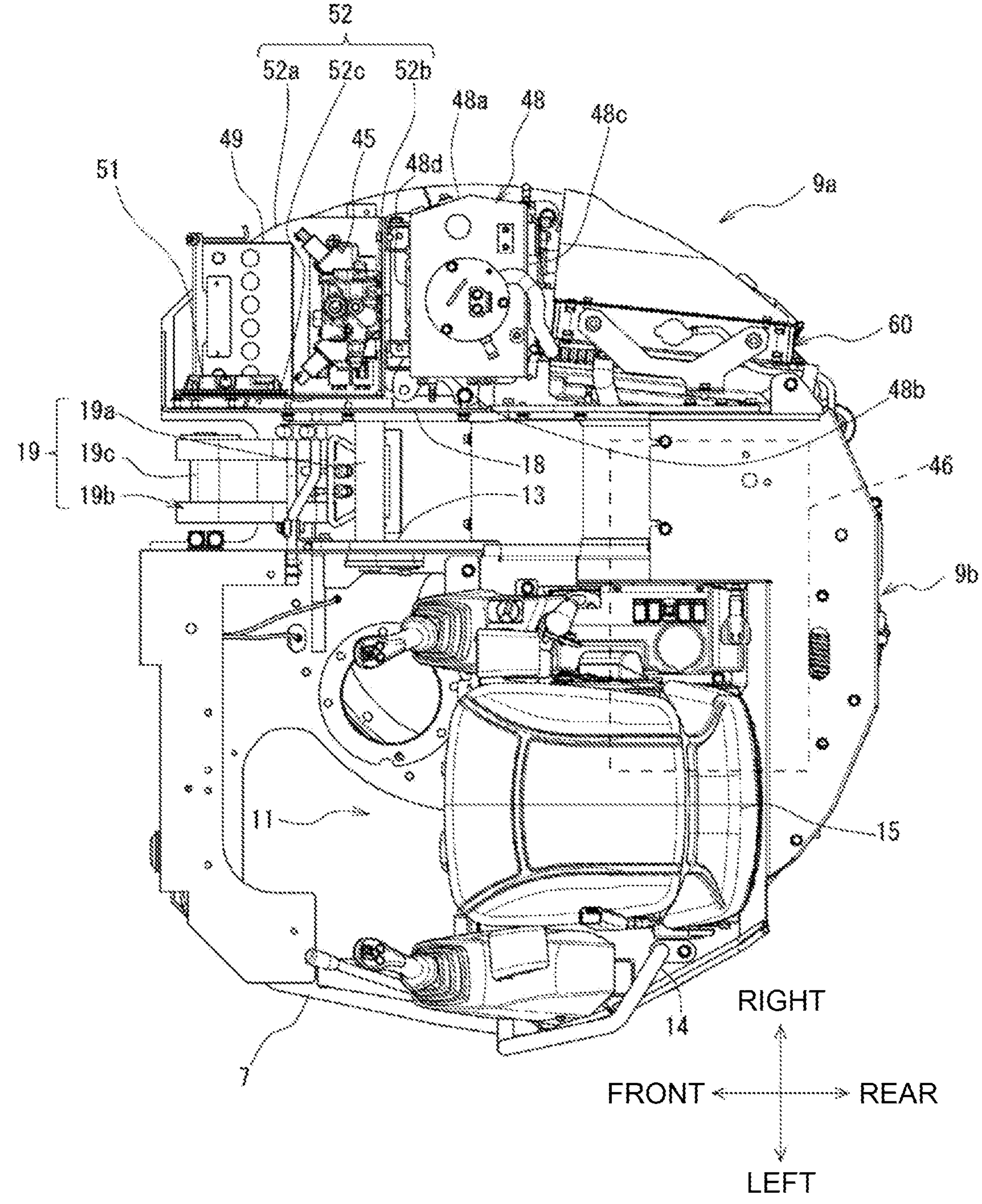
FIG. 4 is a plan view showing the layout of each configuration on the turn frame according to the embodiment of the present invention.
Figure 5:
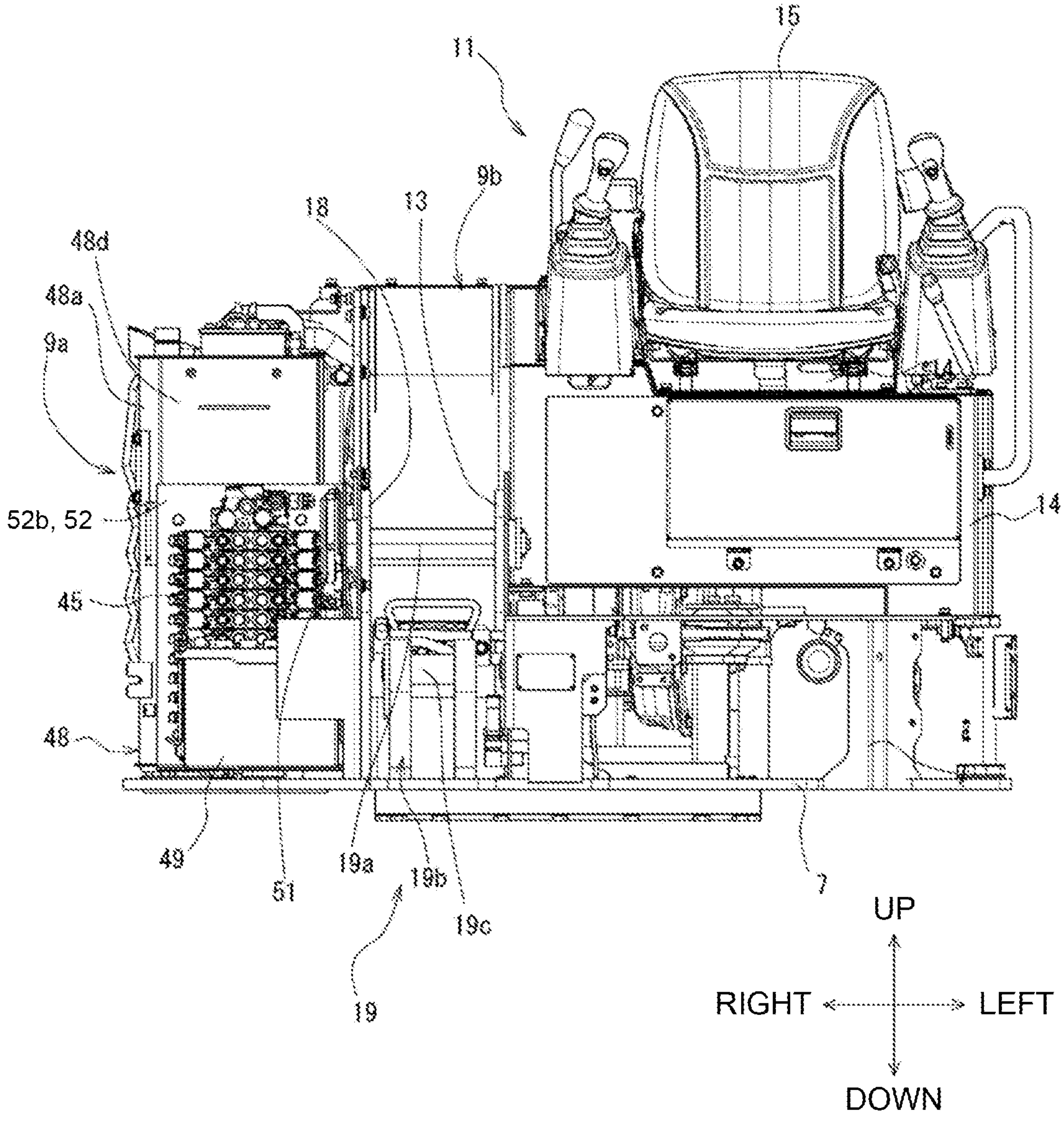
FIG. 5 is a front view showing the layout of each configuration on the turn frame according to the embodiment of the present invention.

Referring to FIGS. 3 to 5, the layout of the various configurations on the turn frame 7 is further explained, especially the configuration placed in the right engine chamber 9*a*. Further, FIGS. 3 to 5 show a state of removing the cabin 10 and exterior covers (right hood 16 and rear hood 17).

The right engine chamber 9*a* is a housing chamber that, on one side (right side) of a machine body, houses the hydraulic oil tank 48, the control valve 45, a battery 49, and a cool mechanism 60. Further, the driver seat 15 is placed on the other side (left side) of the machine body.

The hydraulic oil tank 48, due to the hydraulic oil tanked therein thereby to make its weight heavier than other configurations, in view of a weight balance on the turn frame 7, is placed in a position in the center of the right engine chamber 9*a* in the front-back direction.

The cool mechanism 60 includes a radiator for cooling the cool water of the engine 46, an oil cooler for cooling the hydraulic oil, and a cool fan. In the present embodiment, the engine 46 is placed in the rear part of the turn frame 7, so the cool mechanism 60 is placed in a position that is behind the hydraulic oil tank 48 and that is close to the engine 46.

The control valve 45 is placed in front of the hydraulic oil tank 48. The control valve 45 is supported vertically on the support member 52. The support member 52 includes a bottom plate part 52*a*, a back plate part 52*b* and a side plate part 52*c* which are erected on the bottom plate part 52*a*. The back plate part 52*b* and the side plate part 52*c* are formed by bending a sheet metal into an L-shape in plan view, and the back plate part 52*b* and side plate part 52*c* enclose the back side and right side of the control valve 45.

The back plate part 52*b* supports the back side of the control valve 45, and is also a partition plate that partitions, on the turn frame 7, an area of placing the control valve 45 and an area of placing the hydraulic oil tank 48. Further, the side plate part 52*c* is an inner wall part placed in a position opposite the right front side face cover part 16*a* of the right hood 16 in the right engine chamber 9*a*, and is also so provided as to be usable as a member to support a configuration other than the control valve 45.

As shown in FIG. 4, the control valve 45, in plan view, is so placed toward the bulkhead 18 as to be offset from a side face 48*b* opposite the hydraulic oil tank 48's side face 48*a* facing the right front side face cover part 16*a*. That is, the control valve 45 is placed in a position more shifted inside the turn frame 7 so that, in the right-left width direction of the hydraulic oil tank 48, an entirety of the control valve 45 is housed within a substantially circular outline of the turn frame 7 and the hydraulic pipes (supply piping 61, the supply-discharge piping 65, the return piping 66, etc.) can be easily connected to the respective direction switch valves 45*a*. Thus, the control valve 45 and the hydraulic oil tank 48, which have substantially the same dimension as each other in the left-right direction, are so placed that their center positions in the left-right direction are shifted from each other, positioning the control valve 45 on the inner side (left side) relative to the hydraulic oil tank 48 in the left-right direction.

The battery 49 is placed in front of the control valve 45. More specifically, the battery 49 is fixed to the front part of the bottom plate part 52*a* of the support member 52. Further, the controller 51 is placed in front of the control valve 45, and on the side plate part 52*c*'s right side that is above the battery 49 and that is of the support member 52. The controller 51 and the control valve 45 are electrically connected by a wire harness (not shown) as a power supply line and a signal communication line.

The controller 51 provides a control signal (current of a given magnitude) via the wire harness to the solenoid proportional valve 45*b* of the control valve 45, and has a substantially cuboid shape with a thin thickness. In the present embodiment, the controller 51, in view of easier wiring of the wire harness, is placed in the position close to the control valve 45. More specifically, the controller 51, in plan view and in front view, is placed in a position shifted to the driver seat 15 side relative to the center of the battery 49. That is, the controller 51, in the left-right width direction of the control valve 45, is placed to the left of the control valve 45 and to the left of the center of the battery 49. So placing the controller 51 as to be shifted from the center of the battery 49 to the driver seat 15 side can make a wiring path of the wire harness shorter compared to the conventional one.

Further, the above placing of the control valve 45, the battery 49, and the controller 51 secures, in front of the control valve 45 and above the battery 49, a space for easily connecting the hydraulic piping to each of the direction switch valves 45*a*. Since being mounted to the side plate part 52*c* of the support member 52 with the left-right direction as the thickness direction, the controller 51 does not physically interfere with the plural hydraulic pipes connected to the control valve 45, and is not an obstacle in maintenance work of the battery 49.

Further, the controller 51, as the case may be, communicates with another instrument via the wire harness, such as acquiring, from the pressure sensor 63, the pressure value of the hydraulic oil discharged from the hydraulic pump 41 when generating the control signal. Due to this, for wiring the wire harness to the controller 51, the wiring path is provided along a member included in a frame structure that is away from the exterior cover, that is inside the machine body, and that is of the turn frame 7. This can prevent the wire harness from being damaged by an external force.

Further, the controller 51 is an electronic instrument, and is required to be placed in a position not susceptible to an external shock. In the present embodiment; in the right engine chamber 9*a*, the controller 51 is placed on the support member 52's side plate part 52*c* positioned on the bulkhead 18 side opposite the right front side face cover part 16*a* included in the right outer side of the turn frame 7. Thus, even when the right hood 16 is shocked, the shock is not applied to the controller 51 on the more inward bulkhead 18 side of the turn frame 7.

In the present embodiment, the support member 52 has the back plate part 52*b* and the side plate parts 52*c* which are erected relative to the bottom plate part 52*a*, but the support member 52 may be an L-shaped one in side view including the bottom plate part 52*a* and the back plate part 52*b*. In this case, the controller 51 may be mounted to the bulkhead 18 instead of the omitted side plate part 52*c*. Further, the bulkhead 18 includes, not only the part that doubles as the reinforcing member for the turn frame 7, but also a plate member, although being omitted in FIGS. 3 and 4, that covers a range up to the height of one side end of the upper face cover part 16*c* of the right hood 16.

The excavation machine 1 according to the present embodiment equipped with the configuration described above can easily wire the wire harness between the controller 51 and the instrument electrically controlled by the controller 51.

In the present embodiment, the excavation machine 1 is provided with the hydraulic system that controls the flow direction and flowrate of the hydraulic oil in the control valve 45 based on the electric signal input from the operation device 47, and the controller 51 is placed in front of the control valve 45. The above configuration can simplify the wiring of the wire harnesses of the controller 51 and control valve 45.

Further, in the present embodiment, the battery 49 that supplies power to the controller 51 is placed in front of the control valve 45, and the controller 51 is placed above the battery 49. This configuration allows for the simplified wiring of the wire harness between the controller 51 and the control valve 45 while effectively using the free space above the battery 49.

Further, in the present embodiment, the control valve 45 and the battery 49 each have one side face that is on one of right and left sides of the vehicle frame (turn frame 7) of the engine chamber 9 for placing a prime mover (engine 46) and that is placed in an area covered with the exterior cover. That is, the control valve 45 and the battery 49 are placed in the right engine chamber 9*a* covered with the right hood 16. Then, in the direction that separates the controller 51 from the exterior cover (right front side face cover part 16*a* of the right hood 16) in the left-right direction of the vehicle frame (turn frame 7), the controller 51 is offset relative to the center of the battery 49. That is, from the center of the battery 49, the controller 51 is placed in the position close to the bulkhead 18 opposite the right front side face cover part 16*a*. According to the above configuration, the controller 51 is placed in the position that is away from the right front side face cover part 16*a* and that is more inside the right engine chamber 9*a*, thus making it possible to protect the controller 51 from a transverse shock in the event of the obstacle shocking the right hood 16 of the turn frame 7. Further, the placing of the battery 49 offset from the center to the bulkhead 18 side can secure a work space above the battery 49, also facilitating maintenance of the battery 49.

Further, in the present embodiment, the controller 51 is supported to the inner wall part (side plate part 52*c* of the support member 52) so provided on the vehicle frame (turn frame 7) as to be opposite the side face (right front side face cover part 16*a*) of the exterior cover. The above configuration can protect the controller 51 from the shock from the right hood 16 side. The wire harness can be wired from the inner wall part along the reinforcing member (e.g., bulkhead 18) of the turn frame 7, thus also making it possible to protect the wire harness from an external shock. Further, the controller 51 can be placed in the desired height position, thus making it possible to simplify the wiring of the wire harness between the controller 51 and the control valve 45.

Further, in the present embodiment, the control valve 45, in plan view, is so placed as to be shifted toward the inner wall part (the support member 52's side plate part 52*c* and the bulkhead 18) from the hydraulic oil tank 48's side face 48*b* on the driver seat 15 side. The above configuration can easily connect the hydraulic pipes (supply piping 61, supply-discharge piping 65, and return piping 66, etc.) to the control valve 45, and also provide a gap between the hydraulic piping and the right front side face cover part 16*a* of the right hood 16, thereby to make it possible to protect the hydraulic piping.

Further, in the present embodiment; as shown in FIG. 5, the controller 51, in front view, is placed not overlapping the hydraulic oil tank 48. Placing the controller 51 in this way makes it possible to secure the wiring path of wire harness in the straight line in the front-back direction from the controller 51, which is placed in front of the right engine chamber 9*a*, to the rear engine chamber 9*b* positioned behind the turn frame 7. This makes it possible to wire the wire harness in a shortest possible route wire while reducing the bending load on the wire harness.

Further, in the present embodiment, the cool mechanism 60 that cools the hydraulic oil is placed behind the hydraulic oil tank 48. The above configuration makes it easy to connect the piping between the cool path of the cool water that cools the engine 46 placed behind the turn frame 7 and the cool path of the hydraulic oil to be tanked in the hydraulic oil tank 48.

The above description of the embodiment is merely one example of the present invention, and the construction machine according to the present invention is not limited to the above embodiment. Due to this, it is needless to say that, even to those other than the above embodiment, various changes can be made according to the design and the like within the scope that does not depart from the technical concept of the present invention. Further, the effects described in the present disclosure are merely exemplary and are not limited, and another effect may also be exerted.

In the above embodiment, the battery 49 is placed in front of the control valve 45, but may be mounted, for example, below the cool mechanism 60 behind the hydraulic oil tank 48. In this case, it is preferable that the battery 49 should be placed in a position not blocking a ventilation opening of the right rear side face cover part 16*b*.

Further, in the above embodiment, the hydraulic pump 41 is mechanically connected to the engine 46, but it may be so made that an electric motor that drives the hydraulic pump 41 is provided separate from the engine 46 and the hydraulic pump 41 is driven by the electric motor. Further, it may be so made that a large-capacity rechargeable battery, separate from the battery 49, is mounted to the turn frame 7, and an electric motor activated by an external power supply and power supply from the rechargeable battery is employed as the prime mover, in place of the engine 46 as the diesel engine.

Further, in the above embodiment, the layout on the turn frame 7 has the cabin 10 on the left side and the engine chamber 9 on the right side and rear, but the right and left configurations may be reversed. Further, the posture for placing the control valve 45 is properly selected, such as vertical or horizontal, depending on the space.

[Mode]

The present invention may take the following modes.

(1)

In a construction machine, in a housing chamber on a side of a machine body, including: a hydraulic oil tank that tanks a hydraulic oil discharged by a hydraulic pump driven by a prime mover; a plurality of hydraulic actuators actuated by the hydraulic oil discharged from the hydraulic pump; a control valve that controls a flow direction and flowrate of the hydraulic oil to the plurality of hydraulic actuators; and a controller that outputs a signal that controls the control valve, wherein the control valve is placed in front of the hydraulic oil tank, and the controller is placed in front of the control valve.

(2)

The construction machine according to (1), wherein a battery that supplies power to the controller is placed in front of the control valve, and the controller is placed above the battery.

(3)

The construction machine according to (2), wherein a driver seat is placed on another side of the machine body, and the controller is placed in a position shifted to the driver seat side relative to a center of the battery.

(4)

The construction machine according to (3), wherein the controller is supported on an inner wall part on the driver seat side within the housing chamber.

(5)

The construction machine according to (4), wherein the control valve, in plan view, is so placed as to be shifted toward the inner wall part from the hydraulic oil tank's side face on the driver seat side.

(6)

The construction machine according to any of (1) to (5), wherein the controller, in front view, is placed not overlapping the hydraulic oil tank.

(7)

The construction machine according to any of (1) to (6), wherein a cool mechanism that cools the hydraulic oil is placed behind the hydraulic oil tank.

REFERENCE SIGNS LIST

1 excavation machine (construction machine)
2 run vehicle body
3 excavation device
5 run part
7 turn frame (vehicle body frame)
9 engine chamber
9*a* right engine chamber (housing chamber)
10 cabin
11 drive part
14 driver seat support base
15 driver seat
16 right hood (exterior cover)
18 bulkhead (inner wall part)
21 boom
22 arm
23 bucket
26 boom cylinder
27 offset cylinder (hydraulic actuator)
28 arm cylinder (hydraulic actuator)
29 work tool cylinder (hydraulic actuator)
41 hydraulic pump
42 pilot pump
43 hydraulic actuator
44 run hydraulic motor (hydraulic actuator)
45 control valve
46 engine (prime mover)
47 operation device
48 hydraulic oil tank
49 battery
51 controller
52 support member
52*b* back plate part (partition plate)
52*c* side plate part (inner wall part)
60 cool mechanism
61 supply piping
66 return piping

The invention claimed is:

1. A construction machine comprising, in a housing chamber on a side of a machine body:

a hydraulic oil tank configured to hold a hydraulic oil discharged by a hydraulic pump configured to be driven by a prime mover;

a control valve configured to control a flow direction and flowrate of the hydraulic oil to a plurality of hydraulic actuators configured to be actuated by the hydraulic oil discharged from the hydraulic pump; and a controller configured to control the control valve, wherein:

the control valve is positioned in front of the hydraulic oil tank, and the controller is placed entirely in front of the control valve.

2. The construction machine according to claim 1, further comprising in the housing chamber:

a battery configured to supply power to the controller, the battery positioned in front of the control valve, and the controller is positioned directly above a portion of the battery.

3. The construction machine according to claim 2, wherein:

a driver seat is positioned on another side of the machine body, and the controller is positioned in a position shifted to a driver seat side relative to a center of the battery.

4. The construction machine according to claim 3, wherein the controller is configured to be supported on a surface of an inner wall part that faces away from the driver seat within the housing chamber.

5. The construction machine according to claim 4, wherein a center of the control valve, in a plan view, is positioned in a position shifted toward the inner wall part relative to a center of the hydraulic oil tank.

6. The construction machine according to claim 1, wherein the controller, in front view, is positioned such that the controller does not overlap the hydraulic oil tank.

7. The construction machine according to claim 1, wherein a cool mechanism that is configured to cool the hydraulic oil is positioned behind the hydraulic oil tank.

8. The construction machine according to claim 1, further comprising, in the housing chamber on the side of the machine body, a partition separating a space including the hydraulic oil tank from a space including the control valve, wherein the control valve is supported by the partition.

9. A construction machine comprising a housing chamber on a first side of a machine body, the construction machine further comprising, in the housing chamber:

a hydraulic oil tank configured to store a hydraulic oil;

a control valve configured to control a flow of the hydraulic oil to a plurality of hydraulic actuators;

a partition separating, in the housing chamber, a space including the hydraulic oil tank from a space including the control valve; and a controller configured to control the control valve, wherein:

the control valve is positioned in between the hydraulic oil tank and the controller, and the control valve is supported by the partition.

10. The construction machine according to claim 9, further comprising:

a driver seat positioned on a second side of the machine body opposite the first side; and a battery positioned in the housing chamber, wherein the controller is positioned in the housing chamber closer to the second side than a center of the battery.

11. The construction machine according to claim 9, further comprising:

a driver seat positioned on a second side of the machine body opposite the first side, wherein the controller is supported by a plate in the housing chamber, and wherein the controller is positioned on a side of the plate that faces away from the driver seat.

12. The construction machine according to claim 11, wherein a center of the control valve is positioned closer to the plate than a center of the hydraulic oil tank.

13. The construction machine according to claim 11, wherein the controller extends a distance from the plate, and wherein a gap exists between the plate and the hydraulic oil tank that is greater than or equal to the distance.

14. A construction machine comprising a housing chamber on a first side of a machine body configured to rotate about an axis, the construction machine further comprising, in the housing chamber:

a hydraulic oil tank configured to store a hydraulic oil;

a control valve configured to control a flow of the hydraulic oil to a plurality of hydraulic actuators;

a controller configured to control the control valve; and a battery configured to supply power to the controller, wherein:

the control valve is positioned between the hydraulic oil tank and the controller, and the controller is positioned relative to the battery such that a line parallel to the axis extends through the controller and the battery.

15. The construction machine according to claim 14, further comprising:

a driver seat positioned on a second side of the machine body opposite the first side; and wherein the controller is positioned in the housing chamber closer to the second side than a center of the battery.

16. The construction machine according to claim 14, further comprising:

a driver seat positioned on a second side of the machine body opposite the first side, wherein the controller is supported by a plate in the housing chamber, and wherein the controller is positioned on a side of the plate that faces away from the driver seat.

17. The construction machine according to claim 16, wherein a center of the control valve is positioned closer to the plate than a center of the hydraulic oil tank.

18. The construction machine according to claim 16, wherein the controller extends a distance from the plate, and wherein a gap exists between the plate and the hydraulic oil tank that is greater than or equal to the distance.

* * * * *